US011329711B2

(12) United States Patent
Koskela et al.

(10) Patent No.: US 11,329,711 B2
(45) Date of Patent: May 10, 2022

(54) APPARATUS, METHOD AND COMPUTER PROGRAM

(71) Applicant: Nokia Technologies Oy, Espoo (FI)

(72) Inventors: Timo Koskela, Oulu (FI); Samuli Turtinen, Ii (FI); Dawid Koziol, Wroclaw (PL); Chunli Wu, Beijing (CN); Benoist Sebire, Tokyo (JP)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/041,344

(22) PCT Filed: Apr. 6, 2018

(86) PCT No.: PCT/CN2018/082096
§ 371 (c)(1),
(2) Date: Sep. 24, 2020

(87) PCT Pub. No.: WO2019/192019
PCT Pub. Date: Oct. 10, 2019

(65) Prior Publication Data
US 2021/0091844 A1 Mar. 25, 2021

(51) Int. Cl.
*H04B 7/06* (2006.01)
*H04W 36/30* (2009.01)
*H04W 72/04* (2009.01)

(52) U.S. Cl.
CPC ......... *H04B 7/0695* (2013.01); *H04B 7/0617* (2013.01); *H04W 36/305* (2018.08); *H04W 72/046* (2013.01)

(58) Field of Classification Search
CPC .............................. H04W 76/19; H04B 7/0695
See application file for complete search history.

(56) References Cited

U.S. PATENT DOCUMENTS

| 2013/0155847 | A1 | 6/2013 | Li et al. |
| 2018/0097556 | A1 | 4/2018 | Nagaraja et al. |
| 2019/0110281 | A1* | 4/2019 | Zhou ..................... H04W 76/19 |

FOREIGN PATENT DOCUMENTS

| CN | 101489273 A | 7/2009 |
| JP | 2017-208792 A | 11/2017 |
| WO | 2019/192713 A1 | 10/2019 |

OTHER PUBLICATIONS

"3rd Generation Partnership Project; Technical Specification Group Radio Access Network; NR; Physical layer procedures for control (Release 15)", 3GPP TS 38.213, V15.0.0, Dec. 2017, pp. 1-56.

(Continued)

*Primary Examiner* — Kevin Kim
(74) *Attorney, Agent, or Firm* — Nokia Technologies Oy

(57) ABSTRACT

An apparatus comprising at least one processor, and at least one memory including computer program code, wherein the at least one memory and the computer program code are configured, with the at least one processor, to: in response to a determination of a failure of one or more communication beams between the apparatus and a second apparatus, initiate a beam recovery procedure by transmitting a message to a third apparatus, the message comprising information of the failure of one or more communication beams; start a timer in response to the transmitting a message to the third apparatus; and determine whether a beam failure acknowledgement is received from the third apparatus before the timer expires.

20 Claims, 8 Drawing Sheets

(56) References Cited

OTHER PUBLICATIONS

"3rd Generation Partnership Project; Technical Specification Group Radio Access Network; NR; Medium Access Control (MAC) protocol specification (Release 15)", 3GPP TS 38.321, V15.0.0, Dec. 2017, pp. 1-55.
"LS Reply on Beam Failure Recovery", 3GPP TSG RAN WG2#101, R2-1803981, RAN1, Feb. 26-Mar. 2, 2018, 2 pages.
"Beam Failure Recovery for Scell", 3GPP TSG-RAN WG2#101, R2-1801814, Agenda: 10.3.1.13, Huawei, Feb. 26-Mar. 2, 2018, 2 pages.
International Search Report and Written Opinion received for corresponding Patent Cooperation Treaty Application No. PCT/CN2018/082096, dated Dec. 28, 2018, 9 pages.
"Identified Inconsistencies Between RAN1 and RAN2 Decisions on Beam Management", 3GPP RAN #79, RP-180475, Agenda: 9.2.1, Qualcomm Incorporated, Mar. 19-22, 2018, pp. 1-3.
"Beam Recovery in NR", 3GPP TSG-RAN WG1#90, R1-1714251, Agenda: 6.1.2.2.7, Nokia, Aug. 21-25, 2017, 6 pages.
Extended European Search Report received for corresponding European Patent Application No. 18913514.8, dated Oct. 20, 2021, 13 pages.
"Beam Failure Recovery in Scell and contention-based BFR on SpCell", 3GPP TSG-RAN WG2 #101Bis, R2-1805414, Agenda: 10.3.1.42, Ericsson, Apr. 16-20, 2018, pp. 1-6.
"NR-AH1801#19: Corrections on L1 Parameters (except CSI-RS) for EN-DC", 3GPP TSG-RAN WG2 Meeting #101, R2-1804020, Rapporteur (Ericsson), Feb. 26-Mar. 2, 2018, 242 pages.
"3rd Generation Partnership Project; Technical Specification Group Radio Access Network; NR; Medium Access Control (MAC) protocol specification (Release 15)", 3GPP TS 38.321, V15.1.0, Mar. 2018, pp. 1-67.
"Consideration on the RLF and beam failure in NR", 3GPP TSG-RAN WG2 Meeting #99, R2-1708118, Agenda: 10.2.9, ZTE, Aug. 21-25, 2017, 7 pages.
"Issues/Corrections: Beam Failure Recovery Request Procedure", 3GPP TSG-RAN2 AH-1801, R2-1800086, Agenda: 10.3.14.2, Samsung, Jan. 22-26, 2018, 3 pages.
"Short PUCCH for UCI of 1 or 2 Bits", 3GPP TSG RAN WG1 Meeting NR#3, R1-1716665, Agenda: 6.3.2.1.1, Samsung, Sep. 18-21, 2017, pp. 1-4.
Office action received for corresponding Indian Patent Application No. 202047045507, dated Dec. 3, 2021, 7 pages.
Office action received for corresponding Japanese Patent Application No. 2020-554842, dated Dec. 14, 2021, 6 pages of office action and 5 pages of translation available.
"Summary of email discussion on beam failure recovery on Scell", 3GPP TSG RAN WG1 Meeting #92, R1-1803397, Agenda: 7.1.2, CATT, Feb. 26-Mar. 2, 2018, 3 pages.
"Summary 2 on Remaing issues on Beam Failure Recovery", 3GPP TSG RAN WG1 Meeting #92, R1-1803441, Agenda: 7.1.2.2.4, MediaTek Inc, Feb. 26-Mar. 2, 2018, 27 pages.

* cited by examiner

APPARATUS, METHOD AND COMPUTER PROGRAM

RELATED APPLICATION

This application claims priority to PCT Application No. PCT/CN2018/082096, filed on Apr. 6, 2018 which is incorporated herein by reference in its entirety.

FIELD

This disclosure relates to communications, and more particularly to an apparatus, method and computer program in a wireless communication system. More particularly the disclosure relates to beam failures in a wireless communication system.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices.

In a wireless system at least a part of communications occurs over wireless interfaces. The wireless systems can be divided into cells, and are therefore often referred to as cellular systems. A base station may provide at least one cell.

A user can access a communication system by means of an appropriate communication device or terminal capable of communicating with a base station. A communication device of a user is often referred to as user equipment (UE).

A communication system and associated devices typically operate in accordance with a given standard or specification which sets out what the various entities associated with the system are permitted to do and how that should be achieved.

STATEMENT OF INVENTION

In a first aspect there is provided an apparatus comprising at least one processor, and at least one memory including computer program code, wherein the at least one memory and the computer program code are configured, with the at least one processor, to: in response to a determination of a failure of one or more communication beams between the apparatus and a second apparatus, initiate a beam recovery procedure by transmitting a message to a third apparatus, the message comprising information of the failure of one or more communication beams; start a timer in response to the transmitting a message to the third apparatus; and determine whether a beam failure acknowledgement is received from the third apparatus before the timer expires.

According to an example the at least one memory and the computer program code are configured, with the at least one processor to cause the apparatus to transmit information of one or more candidate communication beams to the third apparatus.

According to an example the at least one memory and the computer program code are configured, with the at least one processor to cause the apparatus to transmit the information of one or more candidate communication beams at the same time as transmitting the information of the failure of one or more communication beams.

According to an example the at least one memory and the computer program code are configured, with the at least one processor to cause the apparatus to transmit the information of one or more candidate communication beams while the timer is running.

According to an example the at least one memory and the computer program code are configured, with the at least one processor to cause the apparatus to send information of N candidate beams to the third apparatus.

According to an example the at least one memory and the computer program code are configured, with the at least one processor to cause the apparatus to transmit updated candidate beam information to the third apparatus in response to determining that all of the N candidate beams has changed.

According to an example the at least one memory and the computer program code are configured, with the at least one processor to cause the apparatus to transmit updated candidate beam information to the third apparatus in response to determining that a threshold number of the N candidate beams has changed.

According to an example the at least one memory and the computer program code are configured, with the at least one processor to cause the apparatus to search for at least one candidate communication beam while the timer is running, in response to a determination of there being no candidate communication beams when the communication beam failure occurred.

According to an example the at least one memory and the computer program code are configured, with the at least one processor to cause the apparatus to re-start the timer and send candidate communication beam information, in response to finding at least one candidate communication beam during the search.

According to an example the at least one memory and the computer program code are configured, with the at least one processor to cause the apparatus to de-activate a cell of the second apparatus when the timer expires without a beam failure acknowledgement being received from the third apparatus.

According to an example the at least one memory and the computer program code are configured, with the at least one processor to cause the apparatus to reset the timer in response to a determination that the third apparatus has de-activated a cell of the second apparatus.

According to an example the at least one memory and the computer program code are configured, with the at least one processor to cause the apparatus to cancel the beam recovery procedure when a cell de-activation timer expires.

According to an example the at least one memory and the computer program code are configured, with the at least one processor to cause the apparatus to stop a cell de-activation timer in response to the initiation of the beam recovery procedure.

According to an example the at least one memory and the computer program code are configured, with the at least one processor to cause the apparatus to re-start the cell de-activation timer in response to detecting a scheduling command received at the apparatus.

According to an example the apparatus comprises a user equipment, the second apparatus comprises a base station, and the third apparatus comprises a network node which controls the base station.

According to an example, the second apparatus comprises a base station of a secondary cell of the user equipment, the apparatus also being in communication with a base station of a primary cell.

According to a second aspect there is provided an apparatus comprising at least one processor, and at least one memory including computer program code, wherein the at least one memory and the computer program code are configured, with the at least one processor, to: receive, from a user equipment, information of a communication beam failure of one or more communication beams between the user equipment and a base station; and send an acknowledgement to the user equipment of receipt of the information of communication beam failure.

According to an example, the at least one memory and the computer program code are configured, with the at least one processor to cause the apparatus to receive information of one or more candidate beams.

According to an example, the at least one memory and the computer program code are configured, with the at least one processor to cause the apparatus to receive the information of one or more candidate communication beams at the same time as receiving the information of the communication beam failure.

According to an example, the at least one memory and the computer program code are configured, with the at least one processor to cause the apparatus to receive updated candidate beam information from the user equipment, after receiving the information of one or more candidate beams.

According to an example, the at least one memory and the computer program code are configured, with the at least one processor to cause the apparatus to deactivate a cell of the base station.

According to a third aspect there is provided a method comprising: in response to a determination of a failure of one or more communication beams between an apparatus and a second apparatus, initiating a beam recovery procedure by transmitting a message to a third apparatus, the message comprising information of the failure of one or more communication beams; starting a timer in response to the transmitting a message to the third apparatus; and determining whether a beam failure acknowledgement is received from the third apparatus before the timer expires.

According to an example the method comprises transmitting information of one or more candidate communication beams to the third apparatus.

According to an example the method comprises transmitting the information of one or more candidate communication beams at the same time as transmitting the information of the failure of one or more communication beams.

According to an example the method comprises transmitting the information of one or more candidate communication beams while the timer is running.

According to an example the method comprises sending information of N candidate beams to the third apparatus.

According to an example the method comprises transmitting updated candidate beam information to the third apparatus in response to determining that all of the N candidate beams has changed.

According to an example the method comprises transmitting updated candidate beam information to the third apparatus in response to determining that a threshold number of the N candidate beams has changed.

According to an example the method comprises searching for at least one candidate communication beam while the timer is running, in response to a determination of there being no candidate communication beams when the communication beam failure occurred.

According to an example method comprises re-starting the timer and sending candidate communication beam information, in response to finding at least one candidate communication beam during the search.

According to an example the method comprises de-activating a cell of the second apparatus when the timer expires without a beam failure acknowledgement being received from the third apparatus.

According to an example the method comprises resetting the timer in response to a determination that the third apparatus has de-activated a cell of the second apparatus.

According to an example the method comprises cancelling the beam recovery procedure when a cell de-activation timer expires.

According to an example the method comprises stopping a cell de-activation timer in response to the initiation of the beam recovery procedure.

According to an example the method comprises re-starting the cell de-activation timer in response to detecting a scheduling command received at the apparatus.

According to an example the apparatus comprises a user equipment, the second apparatus comprises a base station, and the third apparatus comprises a network node which controls the base station.

According to an example, the second apparatus comprises a base station of a secondary cell of the user equipment, the apparatus also being in communication with a base station of a primary cell.

According to a fourth aspect there is provided a computer program comprising instructions for causing an apparatus to perform at least: in response to a determination of a failure of one or more communication beams between an apparatus and a second apparatus, initiating a beam recovery procedure by transmitting a message to a third apparatus, the message comprising information of the failure of one or more communication beams; starting a timer in response to the transmitting a message to the third apparatus; and determining whether a beam failure acknowledgement is received from the third apparatus before the timer expires.

According to a fifth aspect there is provided a non-transitory computer readable medium comprising program instructions for causing an apparatus to perform at least the following: in response to a determination of a failure of one or more communication beams between an apparatus and a second apparatus, initiating a beam recovery procedure by transmitting a message to a third apparatus, the message comprising information of the failure of one or more communication beams; starting a timer in response to the transmitting a message to the third apparatus; and determining whether a beam failure acknowledgement is received from the third apparatus before the timer expires.

According to a sixth aspect there is provided a method comprising: receiving, from a user equipment, information of a communication beam failure of one or more communication beams between the user equipment and a base station; and sending an acknowledgement to the user equipment of receipt of the information of communication beam failure.

According to an example, the method comprises receiving information of one or more candidate beams.

According to an example, the method comprises receiving the information of one or more candidate communication beams at the same time as receiving the information of the communication beam failure.

According to an example, the method comprises receiving updated candidate beam information from the user equipment, after receiving the information of one or more candidate beams.

According to an example, the method comprises deactivating a cell of the base station.

According to a seventh aspect there is provided a computer program comprising instructions for causing an apparatus to perform at least: receiving, from a user equipment, information of a communication beam failure of one or more communication beams between the user equipment and a base station; and sending an acknowledgement to the user equipment of receipt of the information of communication beam failure.

According to an eighth aspect there is provided a non-transitory computer readable medium comprising program instructions for causing an apparatus to perform at least the following: receiving, from a user equipment, information of a communication beam failure of one or more communication beams between the user equipment and a base station; and sending an acknowledgement to the user equipment of receipt of the information of communication beam failure.

According to a ninth aspect there is provided an apparatus comprising means for, in response to a determination of a failure of one or more communication beams between the apparatus and a second apparatus, initiating a beam recovery procedure by transmitting a message to a third apparatus, the message comprising information of the failure of one or more communication beams; means for starting a timer in response to the transmitting a message to the third apparatus; and means for determining whether a beam failure acknowledgement is received from the third apparatus before the timer expires.

According to an example the apparatus comprises means for transmitting information of one or more candidate communication beams to the third apparatus.

According to an example the apparatus comprises means for transmitting the information of one or more candidate communication beams at the same time as transmitting the information of the failure of one or more communication beams.

According to an example the apparatus comprises means for transmitting the information of one or more candidate communication beams while the timer is running.

According to an example the apparatus comprises means for sending information of N candidate beams to the third apparatus.

According to an example the apparatus comprises means for transmitting updated candidate beam information to the third apparatus in response to determining that all of the N candidate beams has changed.

According to an example the apparatus comprises means for transmitting updated candidate beam information to the third apparatus in response to determining that a threshold number of the N candidate beams has changed.

According to an example the apparatus comprises means for searching for at least one candidate communication beam while the timer is running, in response to a determination of there being no candidate communication beams when the communication beam failure occurred.

According to an example the apparatus comprises means for re-starting the timer and sending candidate communication beam information, in response to finding at least one candidate communication beam during the search.

According to an example the apparatus comprises means for de-activating a cell of the second apparatus when the timer expires without a beam failure acknowledgement being received from the third apparatus.

According to an example the apparatus comprises means for resetting the timer in response to a determination that the third apparatus has de-activated a cell of the second apparatus.

According to an example the apparatus comprises means for cancelling the beam recovery procedure when a cell de-activation timer expires.

According to an example the apparatus comprises means for stopping a cell de-activation timer in response to the initiation of the beam recovery procedure.

According to an example the apparatus comprises means for re-starting the cell de-activation timer in response to detecting a scheduling command received at the apparatus.

According to an example the apparatus comprises a user equipment, the second apparatus comprises a base station, and the third apparatus comprises a network node which controls the base station.

According to an example, the second apparatus comprises a base station of a secondary cell of the user equipment, the apparatus also being in communication with a base station of a primary cell.

According to a tenth aspect there is provided an apparatus comprising means for receiving, from a user equipment, information of a communication beam failure of one or more communication beams between the user equipment and a base station; and sending an acknowledgement to the user equipment of receipt of the information of communication beam failure.

According to an example the apparatus comprises means for receiving information of one or more candidate beams.

According to an example the apparatus comprises means for receiving the information of one or more candidate communication beams at the same time as receiving the information of the communication beam failure.

According to an example the apparatus comprises means for receiving updated candidate beam information from the user equipment, after receiving the information of one or more candidate beams.

According to an example the apparatus comprises means for deactivating a cell of the base station.

BRIEF DESCRIPTION OF FIGURES

Some embodiments will now be described in further detail, by way of example only, with reference to the following examples and accompanying drawings, in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
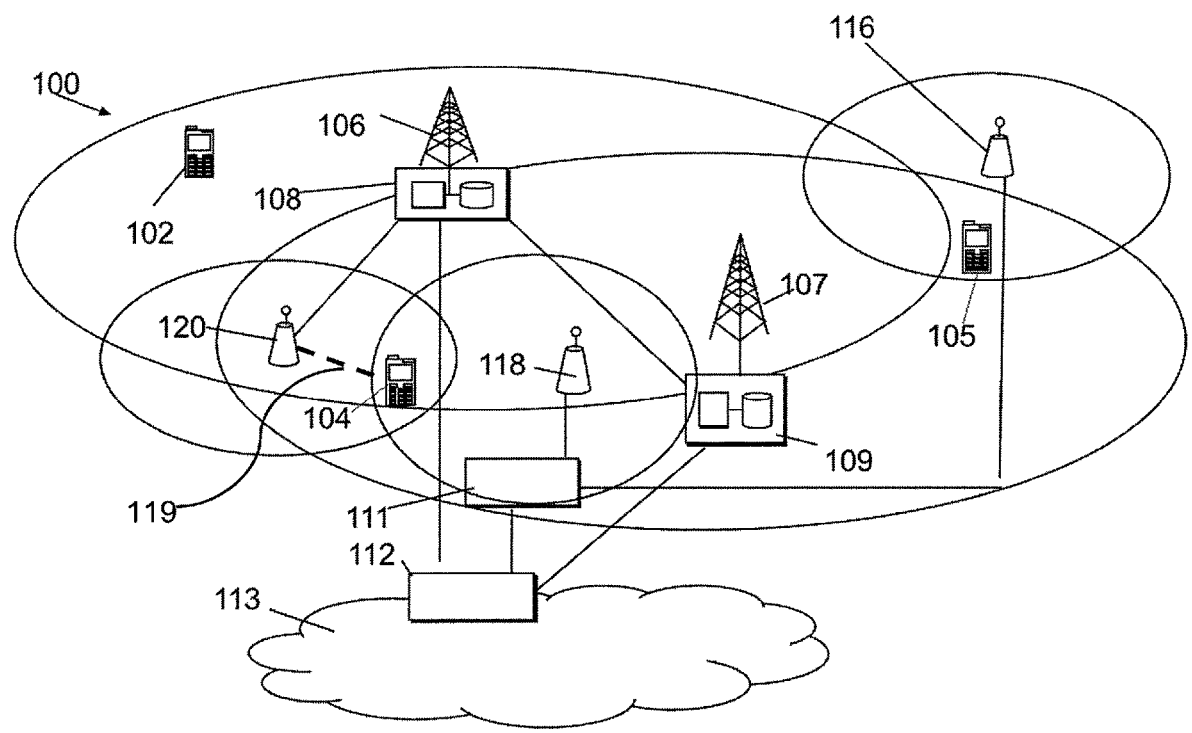
FIG. 1 shows a schematic example of a wireless communication system.

In a wireless communication system 100, such as that shown in FIG. 1, a wireless communication devices, for example, user equipment (UE) or MTC devices 102, 104, 105 are provided wireless access via at least one base station or similar wireless transmitting and/or receiving wireless infrastructure node or point. Such a node can be, for example, a base station or an eNodeB (eNB), or in a 5G system a Next Generation NodeB (gNB), or other wireless infrastructure node. These nodes will be generally referred to as base stations. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller. Other examples of radio access system comprise those provided by base stations of systems that are based on technologies such as 5G or new radio, wireless local area network (WLAN) and/or WiMax (Worldwide Interoperability for Microwave Access). A base station can provide coverage for an entire cell or similar radio service area.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

In FIG. 1 a beam 119 is schematically shown between UE 104 and base station 120. The beam may also be referred to as a link e.g. a radio or communication link. The beam 119 may comprise a channel. For example the beam 119 may comprise an antenna radiation pattern used for transmitting physical downlink control channel (PDCCH).

Figure 2:
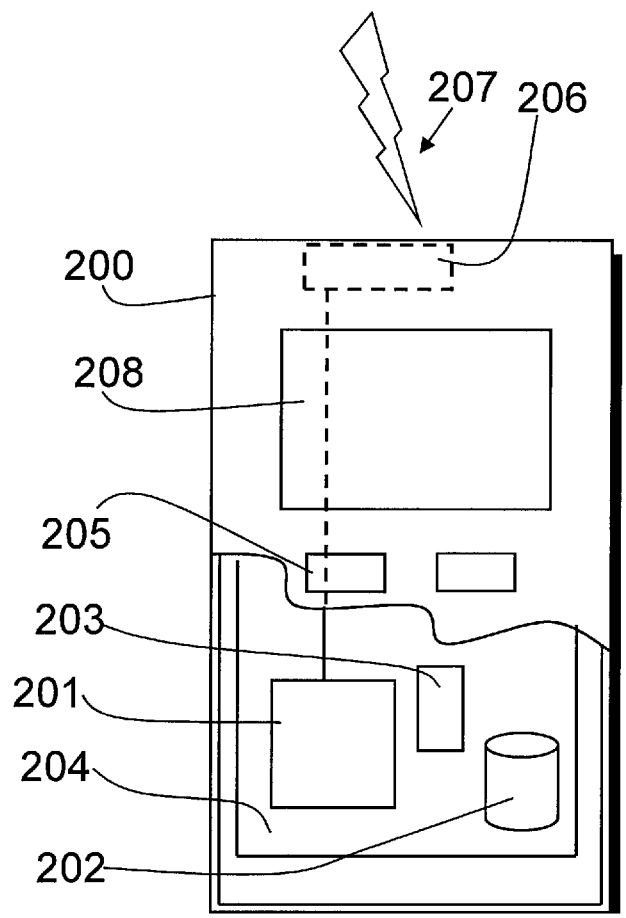
FIG. 2 shows an example of a communication device.

A possible wireless communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the wireless device.

A wireless device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the wireless device by means of a suitable user interface such as key pad 205, voice commands, touch sensitive screen or pad, combinations thereof or the like. A display 208, a speaker and a microphone can be also provided. Furthermore, a wireless communication device may comprise appropriate connectors (either wired or wireless) to other devices and/or for connecting external accessories, for example hands-free equipment, thereto. The communication devices 102, 104, 105 may access the communication system based on various access techniques.

Figure 3:
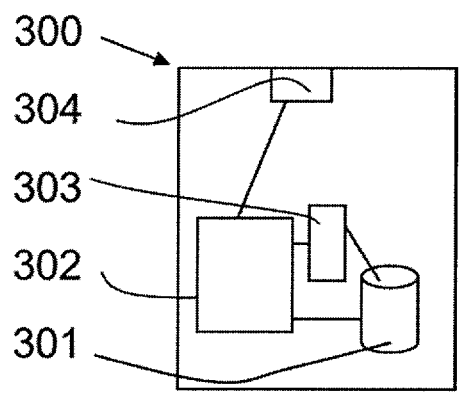
FIG. 3 shows an example of a control apparatus.

FIG. 3 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station.

The receiver and/or the transmitter may be implemented as a radio front end or a remote radio head. For example the control apparatus 300 or processor 201 can be configured to execute an appropriate software code to provide the control functions.

The logical architecture of a gNB may comprise a central unit (CU) and distributed unit (DU) split (CU/DU split). The CU is a logical node that may include gNB functions such as transfer of user data, mobility control, radio access network sharing, positioning, session management. Other functions may be allocated to the DU. In some examples the DU is controlled by the CU. The way in which functions are split between the CU and DU may vary between implementations.

Currently in 3GPP, a beam (or link) failure recovery procedure is specified. Beam recovery may be also referred to as link reconfiguration. A purpose of beam recovery is to detect when one or multiple serving control channels (PDCCH) links is/are considered to be in failure conditions and to recover the link. To recover the link, a UE may initiate signaling towards the network to indicate the failure. A new potential link (beam) may be referred to as a candidate link (beam). As a response to a beam failure recovery request received from a UE, the network may configure a UE with a new PDCCH link. Beam recovery is specified by 3GPP in specifications 38.213 and 38.321.

Some aspects and terminology that may be associated with beam failure are discussed below.

Beam Failure Detection RS (Reference Signals)

The network configures a UE with a set of reference signals for monitoring the quality of the link. This set may be referred as "q0" or "beam failure detection RS" or BFD-RS. Typically, BFD-RS(s) are configured to be spatially QCL'd (quasi co-located) with PDCCH DMRS (demodulation reference signal). That is these reference signals correspond to downlink beams used to transmit PDCCH. Downlink beams may be identified by reference signal, either SS/PBCH (synchronization sequences/physical broadcast channel) block index or CSI-RS (channel state information reference signals) resource index. The network may configure the BFD-RS list using RRC (radio resource control) signaling or it may be possible to define a way to use the BFD-RS list with combined RRC+MAC CE signaling where the MAC CE can be used to activate set or subset of RRC configured resources as BFD-RS.

When a UE is not explicitly configured with BFD-RS list, it may determine the BFD-RS resources implicitly. For example the UE may implicitly determine the BFD-RS resources based on the configured/indicated/activated PDCCH-TCI (transmission configuration indication) states per CORESET i.e. the downlink reference signals (CSI-RS, SS/PBCH block) that are spatially QCL'd with PDCCH DMRS, or in other words, PDCCH beams. Activated TCI states (used by UE for monitoring PDCCH) are considered for beam failure detection, but it is not excluded by this disclosure to determine failure based on all the TCI states for PDCCH.

Declaring Beam Failure

The physical layer may assess the quality of the radio link (based on BFD-RS in set of q0) periodically. Assessment may be done per BFD-RS. When the radio link condition of each BFD-RS in the beam failure detection set is considered to be in failure condition e.g. the hypothetical PDCCH BLER (block error rate) estimated using the RS is above the configured threshold, a beam failure instance (BFI) indication is provided to higher layer (MAC). One example of BLER threshold value may be the out of sync threshold used for radio link monitoring OOS/Qout=10%. Evaluation and indication may be done periodically. If the at least one BFD-RS is not in failure condition, no indication is provided to higher layer.

The MAC layer may implement a counter to count the BFI indications from the PHY (physical) layer, and if the BFI counter reaches a maximum or threshold value (which may be configured by the network), a beam failure may be declared. This counter can be configured to be supervised or monitored by or using a timer. For example each time MAC receives a BFI indication from lower layer a timer is (re-)started. Once the timer expires, the BFI counter is reset (counter value is set to zero). Alternatively or additionally, a timer may also be configured to supervise the beam failure recovery procedure. The timer may be started upon detecting beam failure, and, when the timer expires, the UE declares the beam failure recovery to be unsuccessful. While the timer is running, the UE may try to recover the link.

Candidate RS (Beam) List

The network may provide the UE with a list of candidate RSs for recovery that can be indicated using dedicated signals. For example candidate beam L1-RSRP (reference signal received power) measurements may be provided to MAC layer which performs the selection of the new candidate and may determine the uplink resources to indicate the new candidate to network. The network may configure the UE with dedicated signaling resources (e.g. a set of physical random access channel (PRACH) resources) that are candidate beam specific. For example the UE can indicate the new candidate by sending a preamble.

Beam Failure Recovery Request

A beam failure recovery procedure may be initiated if the UE has declared beam failure and the UE has detected a new candidate beam or beams based on L1 (layer 1) measurements (e.g. L1-RSRP). A dedicated signal may be configured per candidate RS in the Candidate-Beam-RS-List. A specific threshold may be configured so that if any of the new candidates (based on L1-RSRP measurements) are above the threshold, they can be indicated using dedicated signal (set of resources in set q1). The designated signal may be for example from the PRACH pool (or from the PRACH preamble signal resource set or a separate preamble resource configuration), which can be referred to as BFR resource or CFRA (Contention Free Random Access) resource for beam failure recovery (BFR). It is to be noted that beam recovery procedure differs slightly from Random Access (RA) procedure in terms of gNB response to the transmitted preamble. The UE selects a candidate beam from a set of candidates that can be indicated using dedicated signals and in case there are no candidate beams (in terms of signal quality such as RSRP) above the configured threshold, the UE may utilize contention based signaling to indicate new candidate (CBRA (contention based random access) preamble resources are mapped to specific downlink RS e.g. SS/PBCH block/CSI-RS). The above described selection threshold may be configured as RSRP threshold. Other thresholds such as RSRQ, SINR, BLER may also be used.

The UE may monitor the network response to BFRR (or BFRQ) during the beam recovery response window (similar to RAR window) using the same beam alignment (i.e. same beam direction/spatial filter/antenna pattern that was used for TX is used for RX) used for transmitting the recovery signal. The UE may expect the network to provide a response using a beam that is spatially QCL'd with the indicated downlink reference signal.

In case of contention free signaling used for beam recovery purposes the UE may expect the network to respond to the UE using C-RNTI (cell-RNTI) instead of RA-RNTI (random access-RNTI) when CFRA (contention free random access) procedure is used. In case CBRA resources are used, UE expects response as normal in RA procedure.

Currently the beam failure recovery (BFR) or link reconfiguration procedure does not differentiate between primary cell (Pcell) and secondary cell (Scell) and can be applied to a serving cell. This may also apply to a case where the Scell also has a corresponding uplink carrier. If a UE has corresponding UL carrier with Contention Based RACH configuration the current BFR/link reconfiguration procedures may be applied directly. The presence of Pcell and Scell may occur when there is a UE configured with carrier aggregation. UE may also be connected with dual or multi-connectivity and PCell may be referred to as PSCell in the seconday node (SN). More generally a PCell/PSCell or SCell can be referred as serving cells.

Figure 4:
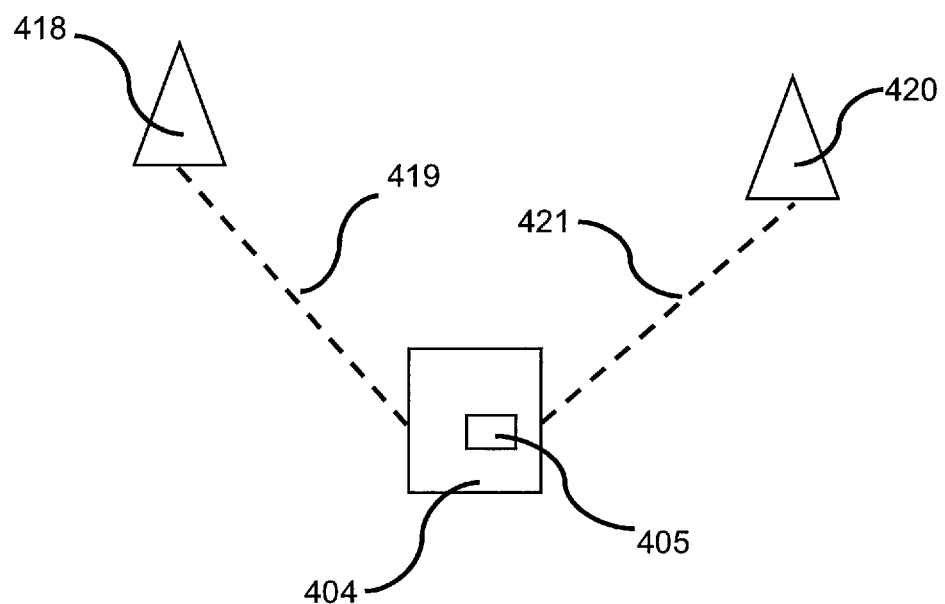
FIG. 4 schematically shows a user equipment in communication with first and second base stations.

FIG. 4 shows an example of a UE 404 connected to a first base station 418 and a second base station 420. For example the base station 418 may comprise an MN (Master Node) and the second base station 420 may comprise a SN (Secondary Node). In other words the base station 418 may comprise a base station of a primary cell and the base station 420 may comprise a base station of a secondary cell. The UE 404 may be in dual connectivity with base station 418 and base station 420. The UE 404 may be performing carrier aggregation with base station 418 and base station 420. It should be understood that the base station 418 and base station 420 may also only comprise of one base station serving the UE 404 in dual connectivity or in carrier aggregation. A communication beam or link 419 is schematically shown between UE 404 and base station 418. A communication beam or link 421 is schematically shown between UE 404 and base station 420. It will be understood that the beam 419 and/or beam 421 may fail or be blocked. This may be due to, for example, interference, abrupt obstacle, etc. Some examples disclosed herein deal with a situation where the beam 421 between a UE 404 and a secondary base station 420 fails or is blocked. A timer of the UE is schematically shown at 405.

Figure 5A:
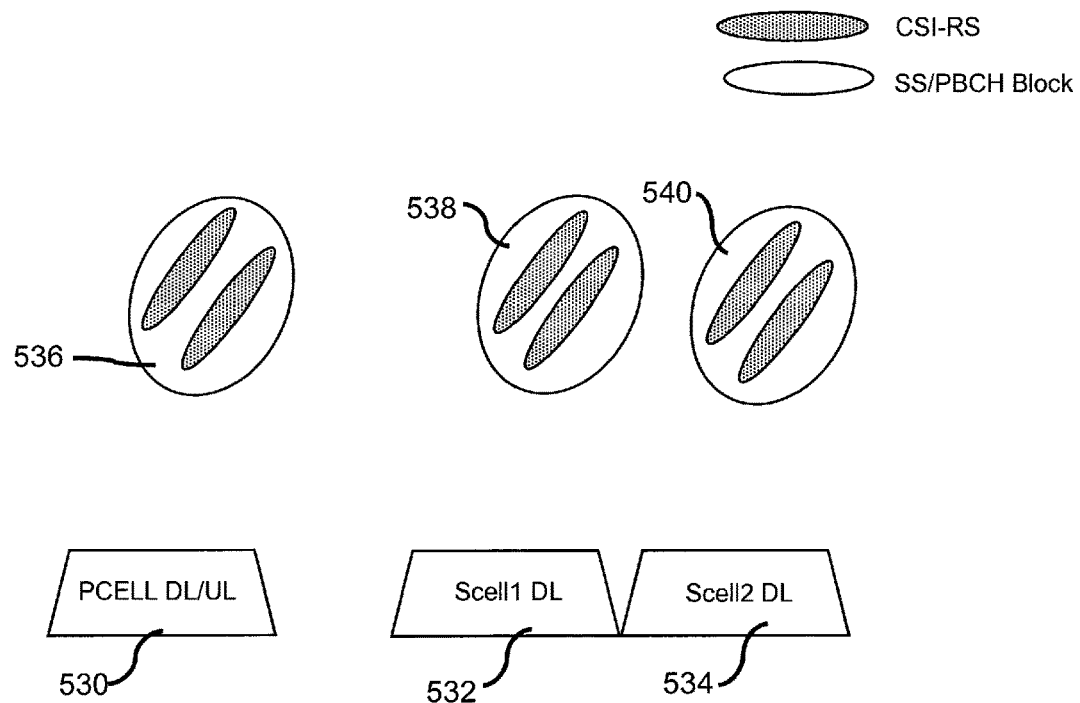
FIG. 5A schematically illustrates beam failure detection configuration.

FIG. 5A illustrate a BFD-RS configuration option considering a scenario where spatial QCL of BFD-RS is assumed (CSI-RS, SS/PBCH block) across the component carriers. As schematically shown in FIG. 5A there is a PCell with DL/UL (PCell has both downlink and uplink) 530, an Scell1 (i.e. first Scell) with DL only (i.e. it has no uplink) 532, and an Scell2 (i.e. second Scell) with DL only 534. CSI-RS symbols 536 correspond to Pcell BFD-RS beam 530, CSI-RS symbols 538 correspond to Scell1 BFD-RS beam 532, and CSI-RS symbols 540 correspond to Scell2 BFD-RS beam 534.

As per the example of FIG. 5A where the cross carrier spatial QCL is valid for PCell and Scell(s) BFD-RS, the beam failure can be detected on BFD-RS resources (CSI-RS, SS/PBCH block) of PCell, and it implicitly can mean that all the SCell(s) are in the beam failure condition due to spatial QCL assumption of the reference signals used for assessing the link quality.

Figure 5B:
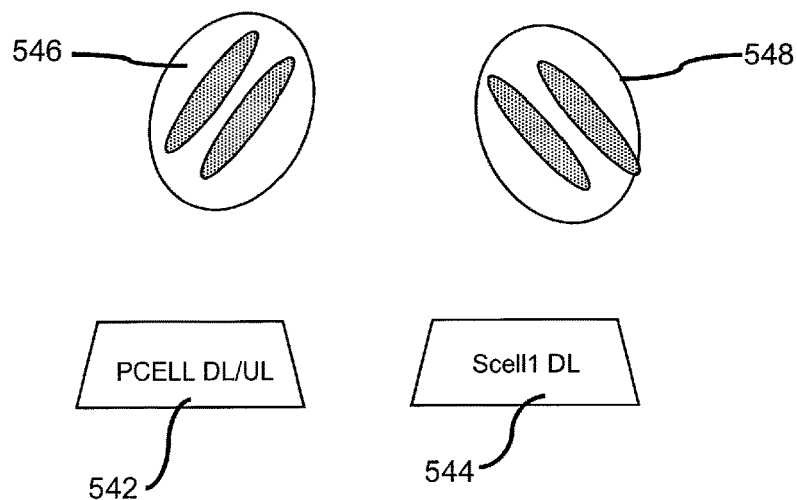
FIG. 5B schematically illustrates beam failure detection configuration.

On the other hand, in case the spatial QCL assumption for BFD-RS does not hold across the carriers (see FIG. 5B), the UE needs to be able to detect beam failure and perform recovery for each serving cell separately. As schematically shown in FIG. 5B there is a PCell DL/UL cell 542, and an Scell1 is a DL cell 532 i.e. there is no Scell2 as in FIG. 5A. CSI-RS symbols 546 correspond to Pcell BFD-RS beam 542, and CSI-RS symbols 548 correspond to Scell1 BFD-RS beam 544.

The scenario of FIG. 5B may occur, for example, when the Pcell is located in a different frequency range to the Scell. For example the Pcell may be located in FR1 (Frequency Range 1 i.e. below 6 GHz) and the SCell may be configured to be downlink only on FR2 (above 6 GHz). Alternatively, both PCell and Scell may operate on same FR but due to the PDCCH TCI configuration (which is cell specific) the BFD-RS detection resources may be different i.e. there may not be correspondence between Pcell and SCell failure. The latter may happen in particular in case a cell with multiple Transmission/Reception Points (TRPs) is deployed.

Without loss of generality, FIGS. 5A and 5B illustrate a subset of possible configurations for carrier aggregation where the SCells have only downlink. The disclosure is not limited to only such cases i.e. SCell may have also an uplink. PCell and SCell have been discussed above, however it is possible to refer only to serving cells and assume that e.g. when PCell has failed and SCell can be used for recovery of PCell, the examples may be used in a similar manner as in case of SCell failure and PCell recovery. SCell may or may not have uplink and if an uplink is configured for SCell it may or may not be used in similar manner as PCell uplink. As an example, although CFRA signals may be configured for SCell uplink it may not have any CBRA resources configured i.e. the beam failure recovery may not work in a similar manner as for PCell. In this case the SCell may need to indicate failure/recovery using PCell uplink if it cannot use CFRA resources on its respective uplink to indicate candidates then it may need to use other signaling mechanisms such as MAC CE. Also, the SCell CFRA signals may be configured on PCell uplink.

The present inventors have identified a problem that when the UE has triggered the BFR procedure on the SCell and signaled the SCell BFR MAC CE or CFRA/CBRA preamble(s) to the network (NW), that it has not been established how the procedure is ended e.g. how the procedure is supervised. The present inventors have also identified that whether the MAC CE reaches the NW cannot be determined reliably by the UE as the MAC CE is not protected or covered by the RLC ARQ (radio link control automatic repeat request) protocol but only with HARQ (Hybrid ARQ) in physical/MAC layers.

According to some examples, the UE initiates a timer after the UE has transmitted a beam failure recovery request (BFRR) message for the recovery of serving cell. The BFRR may be comprised in a MAC CE. The MAC CE may also include information of at least one candidate beam to be added i.e. to replace the failed beam and referred as candidate beam. Therefore in some examples the information transmitted by the UE may comprise an Scell BFRR MAC CE with at least one candidate beam indicated in the MAC CE.

According to one example, as the timer is running the UE transmits candidate beam information to the network. The candidate beam information may be transmitted to the network periodically. If it is determined by the UE that it has not received beam failure recovery acknowledgement and/or new beam information from the network before the timer expires, then the UE deactivates the cell associated with the beam failure. For example, if the UE does not receive a new BFD-RS and/or PDCCH TCI state configuration for Scell before the timer expires, the UE may deactivate the Scell. Due to deactivation the UE may stop monitoring SCell PDCCH and does not initiate uplink transmissions (control/data) as specified currently. In some examples "de-activation" of the cell may mean that a connection to the cell is dropped, but the configuration is not necessarily lost.

According to another example, if it is determined by the UE that it has not received beam failure recovery request acknowledgement and/or new beam information from the network before the timer expires, the UE re-transmits the candidate beam information (e.g. the MAC CE with at least one candidate beam indicated in the MAC CE) to the network. For example if the UE has not received new BFD-RS and/or PDCCH TCI state configuration for SCell before the timer expires, the UE re-transmits the SCell BFRR MAC CE with updated candidate information. That is in some examples the candidate beam information may be different in the re-transmitted MAC CE in comparison with the originally (or earlier) transmitted MAC CE. That is in some examples the UE can transmit updated candidate beam information to the network while the timer is running. In some examples it may be considered that the UE can indicate the Scell BFRR MAC CE with the timer running, if it is determined by the UE that the candidate information has changed. In one example, if the UE has included multiple candidates in the report (e.g. in the MAC CE), updated candidate information is sent to the network only if all or (N-x) candidates have changed, where N is the number of candidates indicated and x a configured or predetermined number. Therefore (N-x) may be considered a threshold value in some examples. In another example, where a highest reported RSRP value has changed by value Y (i.e. a threshold amount which may be expressed as decibels in logarithmic scale or in watts in linear scale) based on new measurements, the UE triggers a new MAC CE to report according to the network configuration. Y may be configurable, in some examples.

According to some examples, when the UE receives new BFD-RS and/or PDCCH TCI state configuration for a failed SCell, the timer as well as reporting of candidates is stopped. In another example the network deactivates the SCell by explicit signaling as a response to UE indication of beam failure (either with new candidates or no candidates). The UE can determine this as successful completion of SCell BFR.

According to some examples, the UE is also configured to deal with a situation where there are no candidate beams available to replace a failed beam. When this occurs, the UE may indicate "no candidates" to the network. For example this indication may be provided in the MAC CE. The sending of the MAC CE (or determining that MAC CE has been successfully transmitted) may again initiate the timer. In such examples, while the timer is running the UE tries to find new candidates on the Scell. If a new candidate is found by the UE, the timer is cancelled or reset, and the MAC CE can be re-transmitted with the new candidate beam information (which may in turn cause the timer to be started again). In some examples the new candidate beams for the Scell may be found by RRC level reconfiguration of new CSI-RS/SS blocks on Scell and measurements thereon. In some examples this may not be visible to MAC layer before L1 provides new measurements and indicates candidate beams. Alternatively, in some examples the timer may be cancelled when a new PDCCH-TCI state has been configured and/or activated by MAC CE. Upon expiry of the timer, the Scell may be deactivated. In some examples, explicit Scell deactivation by the network also cancels timer (can be referred as timer T1).

According to one example, when network (gNB) deactivates the failed SCell, UE determines that the beam failure recovery procedure is completed. UE will stop the procedure of transmitting the SCell BFR MAC CE or any random access procedure to transmit CFRA/CBRA preambles.

According to some examples, the handling of a cell de-activation timer when beam failure recovery procedure has been initiated is considered. The cell de-activation timer may be termed an sCellDeactivationTimer. The sCellDeactivationTimer is a current timer in MAC specification which controls the activation state of an SCell in the UE. If the sCellDeactivationTimer expires, the SCell is deactivated. Therefore in some examples there may be two (or more) timers co-existing. A first timer (T1) may be a timer which, as discussed above, is started in response to sending a beam failure report to the network. In some examples a second timer (T2) is the sCellDeactivationTimer. In one example option the expiry of the sCellDeactivationTimer will cancel/stop the BFR procedure. In one example, this could be considered as alternative implementation of the timer T1. In another example option the sCellDeactivationTimer timer is stopped (which may comprise pausing or re-setting), when UE transmits BFRR (preamble or MAC CE). This is because in some examples the sCellDeactivationTimer won't restart in the UE even if NW tries to schedule the UE, as the UE may not be able to decode the scheduling command on a failed serving cell. In some examples the sCellDeactivationTimer may only be restarted after beam failure recovery has been successfully completed. Alternatively, the sCellDeactivationTimer is restarted only if PDCCH on the failed serving cell indicates a scheduling command (i.e. uplink grant or downlink assignment).

Figure 6:
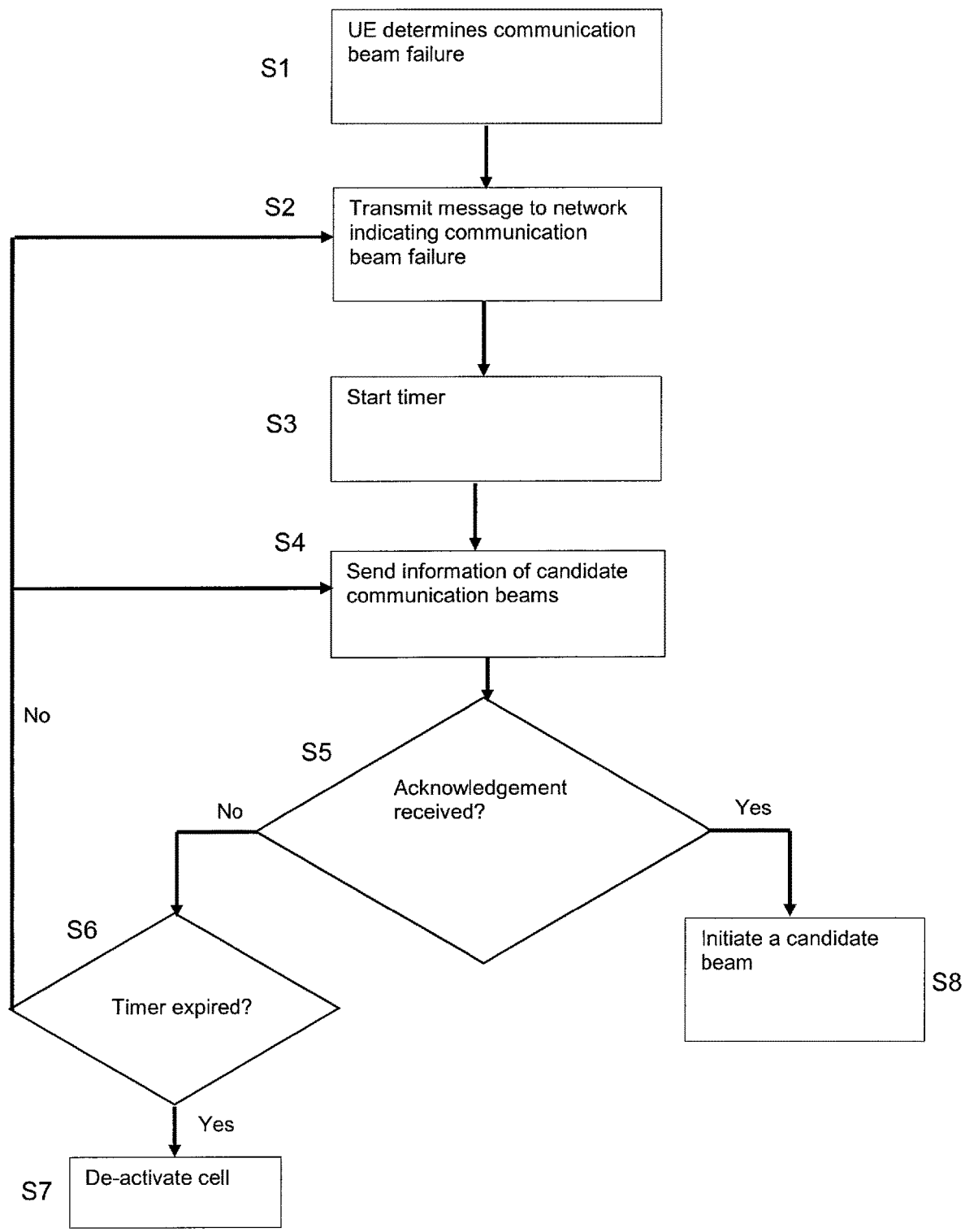
FIG. 6 is a flow-chart of a method according to an example.

FIG. 6 is a flow-chart showing a method according to an example. It will of course be understood that in other examples the method may differ.

At S1, a UE determines that there is a communication beam failure. Beam failure may be determined/detected by the means discussed previously e.g. determining when BFD-RS is considered to be in a failure condition. For example the failure may be failure of a communication beam between the UE and a secondary base station, where the UE was in communication with a primary base station and the secondary base station (e.g. performing carrier aggregation).

At S2, the UE transmits a message to a network node indicating the communication beam failure. For example this message may be sent to a serving cell with uplink.

At S3, the UE starts a timer. In some examples the timer is started simultaneously with, or nearly simultaneously with, the transmitting a message to the network indicating the communication beam failure.

At S4, the UE sends information of candidate communication beams to the network node, to replace the failed communication beam. In some examples S4 may be comprised in S2 i.e. the UE may send the information indicating the communication beam failure and the information of the candidate communication beams together.

At S5, a determination is made by the UE of whether an acknowledgement has been received from the network node. This may be an acknowledgement of the information sent at S2 or of the information sent at S4.

If no acknowledgement is received, then the method proceeds to S6 where it is determined whether the timer has expired.

If the timer has expired (i.e. timer has expired and there has not been an acknowledgement i.e. new TCI state or deactivation) then the method proceeds to S7 where the UE de-activates the cell e.g. de-activates connection with the secondary base station associated with the beam failure.

If the timer has not expired then the method may loop back to S2 and/or S4.

If at S5 it is determined that an acknowledgement has been received at the UE from the network node, then the method may proceed to S8 where the UE can initiate a new connection using one or more of the candidate communication beams. One or more of the candidate communication beams may be between the UE and the base station associated with the communication beam failure, or between the UE and a new base station.

Figure 7:
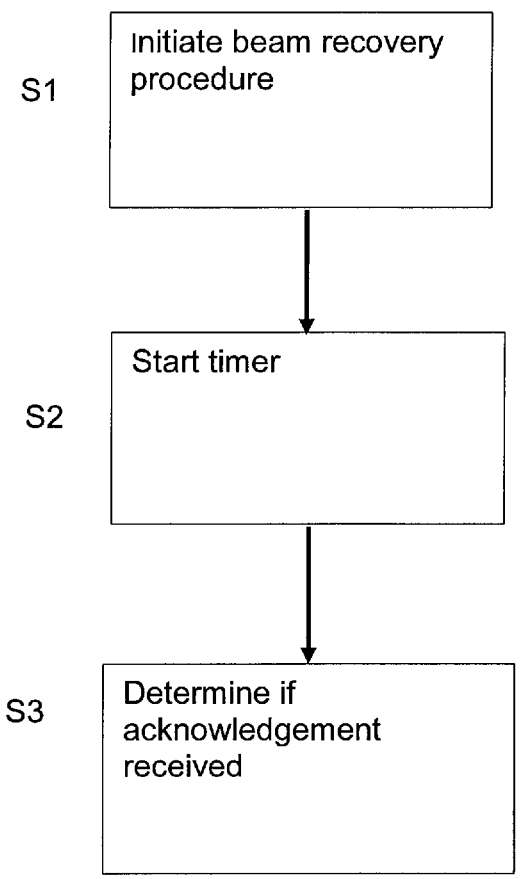
FIG. 7 is a flow-chart of a method according to an example.

FIG. 7 is a flow chart of a method according to an example. The method of FIG. 7 is viewed from the perspective of an apparatus, for example a user equipment.

At S1 the method comprises, in response to a determination of a failure of one or more communication beams between an apparatus and a second apparatus, initiating a beam recovery procedure by transmitting a message to a third apparatus, the message comprising information of the failure of one or more communication beams.

At S2 the method comprises starting a timer in response to the transmitting a message to the third apparatus.

At S3 the method comprises determining whether a beam failure acknowledgement is received from the third apparatus before the timer expires.

Figure 8:
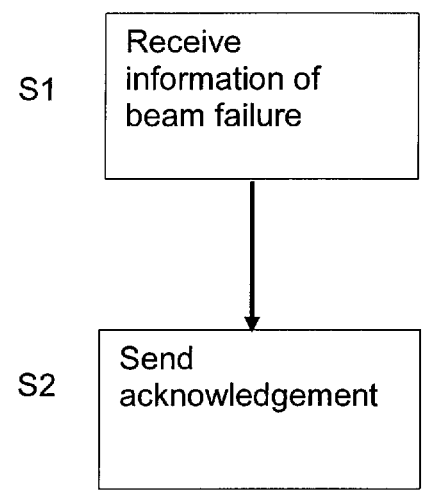
FIG. 8 is a flow-chart of a method according to an example.

FIG. 8 is a flow chart of a method according to an example. The method of FIG. 8 is viewed from the perspective of an apparatus, for example a network node.

At S1 the method comprises receiving, from a user equipment, information of a communication beam failure of one or more communication beams between the user equipment and a base station.

At S2 the method comprises sending an acknowledgement to the user equipment of receipt of the information of communication beam failure.

According to examples, the newly defined timer may ensure that if the MAC CE is lost over the air, the UE will take an action to re-transmit the MAC CE. Alternatively, the UE may deactivate the failed SCell(s) itself, so as not to trigger any further beam failure reporting procedure e.g. in case the network is busy reconfiguring or taking other actions.

The timer allows a time window for the UE to find new candidate beams immediately after indicating the beam failure. Therefore instead of experiencing failure and then performing additional measurements to find new candidates, the UE can indicate the failure quickly. In some examples, indicating beam failure with no new candidates may in some cases allow the network to configure new CSI-RS for candidate beam detection on SCell after failure indication.

In some examples the network may have no knowledge of UE beam failure on SCell and thus it is beneficial to report it quickly while UE can keep searching for candidates. In such examples the network may suspend any data transmission on SCell while UE performs candidate search. This may reduce the signaling overhead and save radio resources.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

What is claimed is:

1. An apparatus comprising at least one processor, and at least one memory including computer program code, wherein the at least one memory and the computer program code are configured, with the at least one processor, to:
   in response to a determination of a failure of one or more communication beams between the apparatus and a second apparatus, initiate a beam recovery procedure by transmitting a message to a third apparatus, the message comprising information of the failure of one or more communication beams;

start a timer in response to the transmitting a message to the third apparatus; and determine whether a beam failure acknowledgement is received from the third apparatus before the timer expires.

2. An apparatus according to claim 1, wherein the at least one memory and the computer program code are configured, with the at least one processor to cause the apparatus to transmit information of one or more candidate communication beams to the third apparatus.

3. An apparatus according to claim 1, wherein the at least one memory and the computer program code are configured, with the at least one processor to cause the apparatus to transmit the information of one or more candidate communication beams at the same time as transmitting the information of the failure of one or more communication beams.

4. An apparatus according to claim 1, wherein the at least one memory and the computer program code are configured, with the at least one processor to cause the apparatus to transmit the information of one or more candidate communication beams while the timer is running.

5. An apparatus according to claim 2, wherein the at least one memory and the computer program code are configured, with the at least one processor to cause the apparatus to send information of N candidate beams to the third apparatus.

6. An apparatus according to claim 5, wherein the at least one memory and the computer program code are configured, with the at least one processor to cause the apparatus to transmit updated candidate beam information to the third apparatus in response to determining that all of the N candidate beams has changed.

7. An apparatus according to claim 5, wherein the at least one memory and the computer program code are configured, with the at least one processor to cause the apparatus to transmit updated candidate beam information to the third apparatus in response to determining that a threshold number of the N candidate beams has changed.

8. An apparatus according to claim 1, wherein the at least one memory and the computer program code are configured, with the at least one processor to cause the apparatus to search for at least one candidate communication beam while the timer is running, in response to a determination of there being no candidate communication beams when the communication beam failure occurred.

9. An apparatus according to claim 8, wherein the at least one memory and the computer program code are configured, with the at least one processor to cause the apparatus to re-start the timer and send candidate communication beam information, in response to finding at least one candidate communication beam during the search.

10. An apparatus according to claim 1, wherein the at least one memory and the computer program code are configured, with the at least one processor to cause the apparatus to de-activate a cell of the second apparatus when the timer expires without a beam failure acknowledgement being received from the third apparatus.

11. An apparatus according to claim 1, wherein the at least one memory and the computer program code are configured, with the at least one processor to cause the apparatus to reset the timer in response to a determination that the third apparatus has de-activated a cell of the second apparatus.

12. An apparatus according to claim 1, wherein the at least one memory and the computer program code are configured, with the at least one processor to cause the apparatus to cancel the beam recovery procedure when a cell de-activation timer expires.

13. An apparatus according to claim 1, wherein the at least one memory and the computer program code are configured, with the at least one processor to cause the apparatus to stop a cell de-activation timer in response to the initiation of the beam recovery procedure.

14. An apparatus according to claim 13, wherein the at least one memory and the computer program code are configured, with the at least one processor to cause the apparatus to re-start the cell de-activation timer in response to detecting a scheduling command received at the apparatus.

15. An apparatus according to claim 1, the apparatus comprising a user equipment, the second apparatus comprising a base station, and the third apparatus comprising a network node which controls the base station.

16. An apparatus according to claim 1, the second apparatus comprising a base station of a secondary cell of the user equipment, the apparatus also being in communication with a base station of a primary cell.

17. An apparatus comprising at least one processor, and at least one memory including computer program code, wherein the at least one memory and the computer program code are configured, with the at least one processor, to:

receive, from a user equipment, information of a communication beam failure of one or more communication beams between the user equipment and a base station;

send an acknowledgement to the user equipment of receipt of the information of communication beam failure; and deactivate a cell of the base station.

18. An apparatus according to claim 17, wherein the at least one memory and the computer program code are configured, with the at least one processor to cause the apparatus to receive information of one or more candidate beams.

19. An apparatus according to claim 18, wherein the at least one memory and the computer program code are configured, with the at least one processor to cause the apparatus to receive the information of one or more candidate communication beams at the same time as receiving the information of the communication beam failure.

20. An apparatus according to claim 18, wherein the at least one memory and the computer program code are configured, with the at least one processor to cause the apparatus to receive updated candidate beam information from the user equipment, after receiving the information of one or more candidate beams.

* * * * *